V. G. BECKER.
APPARATUS FOR BOILING EGGS.
APPLICATION FILED JULY 2, 1917.
1,301,997.
Patented Apr. 29, 1919.
2 SHEETS—SHEET 2.
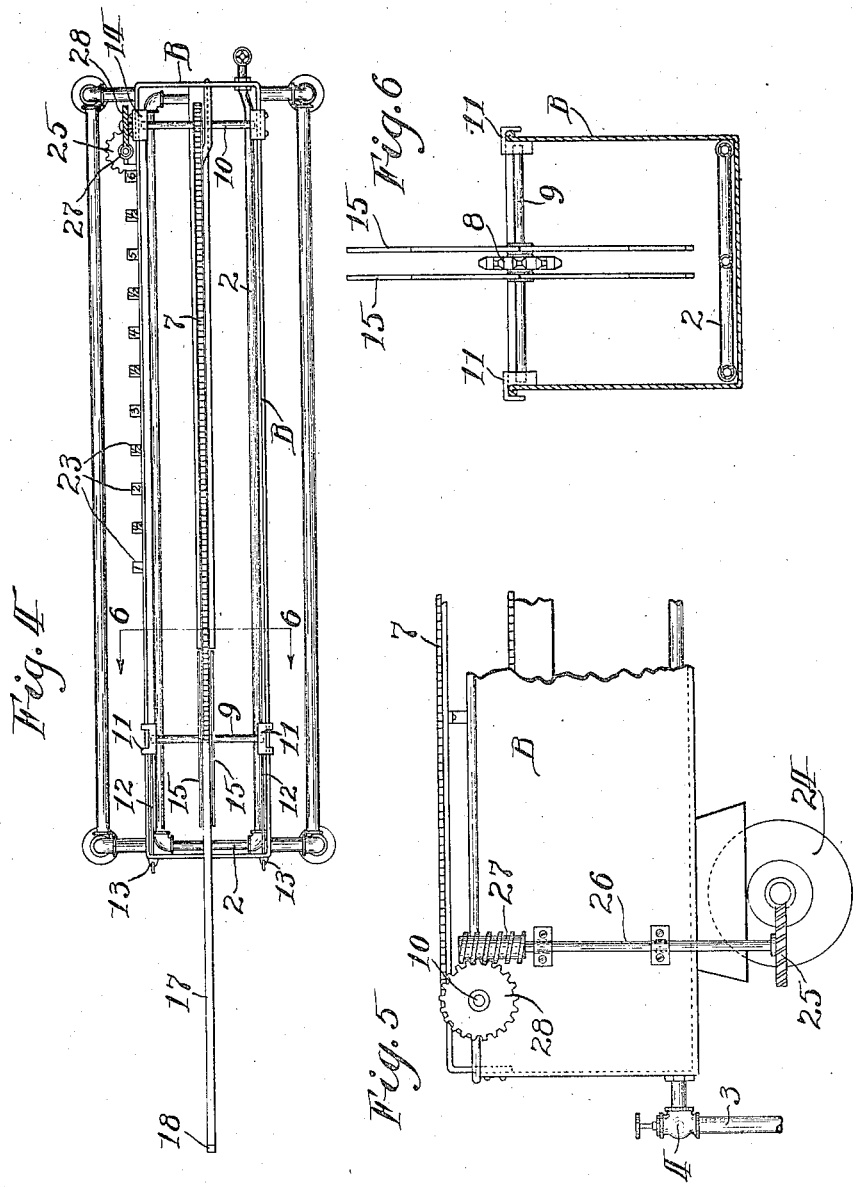
Inventor:
Valentine G. Becker
by: Attorney.

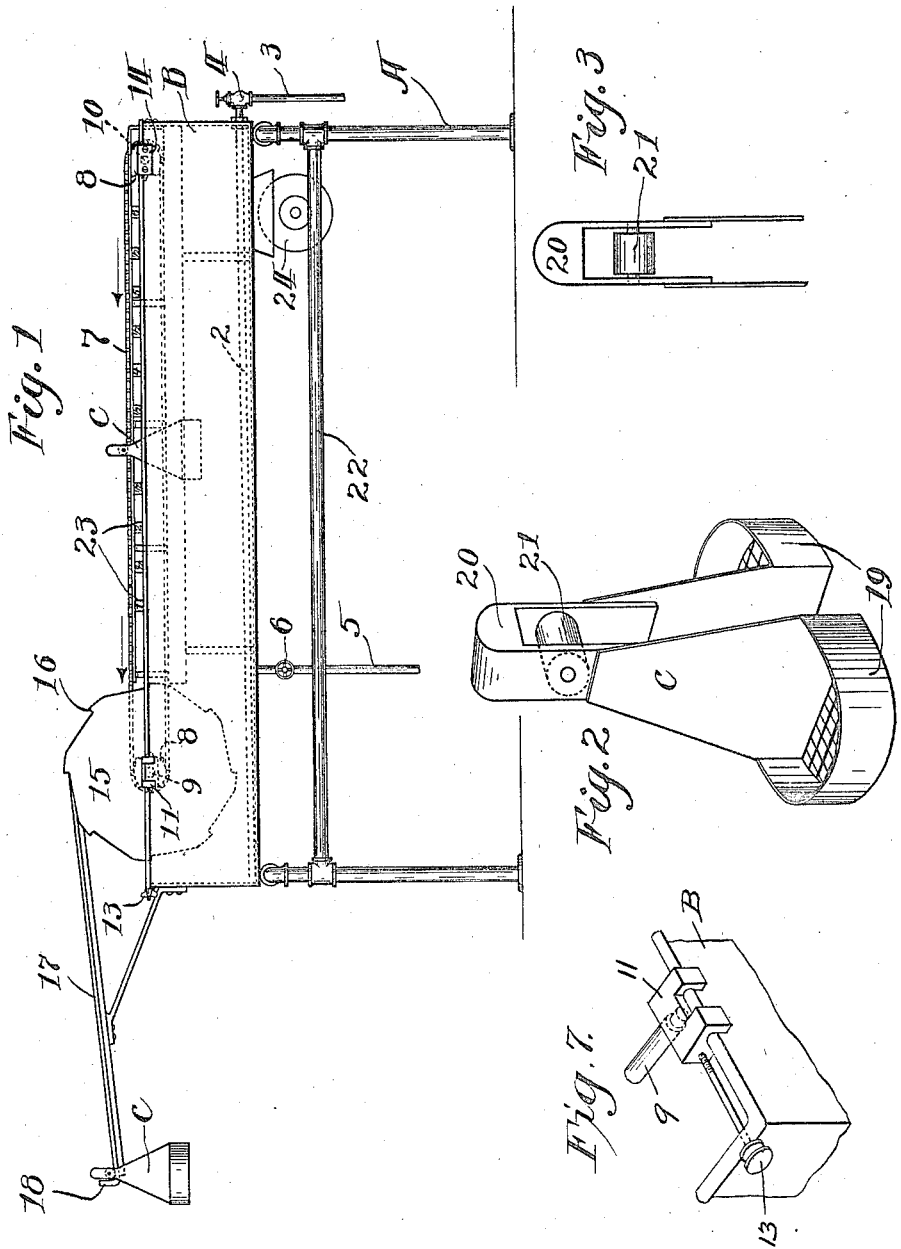

UNITED STATES PATENT OFFICE.

VALENTINE G. BECKER, OF ST. PAUL, MINNESOTA.

APPARATUS FOR BOILING EGGS.

1,301,997.  Specification of Letters Patent.  Patented Apr. 29, 1919.

Application filed July 2, 1917. Serial No. 178,318.

*To all whom it may concern:*

Be it known that I, VALENTINE G. BECKER, a citizen of the United States, residing at St. Paul, in the county of Ramsey and State of Minnesota, have invented certain new and useful Improvements in Apparatus for Boiling Eggs, of which the following is a specification.

My invention relates to improvements in an apparatus for boiling eggs, its object being particularly to provide means in an apparatus of this character for more effectively and conveniently regulating the timing of the operation than with the ordinarily employed construction.

In the accompanying drawings forming part of this specification,

Figure 1 is a side elevation of my improved apparatus;

Fig. 2 is a perspective view of an egg holder forming part of the invention;

Fig. 3 is an elevation of the supporting top of the egg holder;

Fig. 4 is a plan view of my improved apparatus;

Fig. 5 is a side elevation of one end looking from the opposite side shown in Fig. 1;

Fig. 6 is a section on line 6—6 of Fig. 4 with the chain conveyer removed, and

Fig. 7 is a perspective view of the chain adjusting mechanism.

Referring to the drawings, A represents a suitable frame work supporting an open top tank or receptacle B, which tank is adapted to hold the water for boiling the eggs. The water within the tank is heated by a steam coil 2 arranged within the tank, the coil being connected by a pipe 3 with a suitable source of steam supply, an appropriate controlling inlet valve 4 being provided. The tank is adapted to be drained by an outlet 5 provided with a controlling valve 6.

Arranged within the top of the tank is a suitable conveyer chain 7, said chain having traveling support upon sprocket wheels 8 journaled upon shafts 9 and 10 extending across the ends of the tank. The shaft 9 is supported in brackets 11, which fit slidably over the sides of the tank and are adjustable from the end of the tank through the medium of the rods 12 fitted on their ends with adjusting screws 13 whereby to take up the slack of the chain. The shaft 10 is fitted in similar brackets 14 which are removably supported upon the top of the tank but not slidable thereon. For the purpose of picking up the egg holders, as hereinafter described, from the conveyer chain, I provide a pair of disks 15 secured upon the shaft 9 on opposite sides of the sprocket 8, the disks being formed with peripheral teeth 16 equidistantly disposed around the disks and the teeth of the two disks being in alinement. A gravity runway 17, supported by the tank, extends outwardly and downwardly from between the disks above the conveyer chain, the outer end of the runway being formed with an upwardly projecting stop 18.

Egg holders C are employed for holding suspended in the heating liquid the eggs while being boiled. Each of the egg holders is formed with basket portions 19 for holding the eggs, the baskets depending in spaced position from a supporting bracket 20, the bracket 20 being centrally cut away to fit over the conveyer chain and carrying an antifriction roller 21 adapted to rest upon and travel with said chain. When not in use, a plurality of egg holders may be supported upon a horizontally extending side bar 22. A plurality of markers 23 are supported along one side of the top of the tank to indicate the length of time the egg holders are to remain in the water, as hereinafter pointed out. A uniform travel is imparted to the conveyer chain by means of a suitable motor 24 connected by worm wheel 25, shaft 26 and worm 27 with a worm wheel 28 secured on the shaft 10.

In operation of the apparatus, the egg holders, not being used, will, as stated, hang upon the horizontal bar 22. When it is desired to boil eggs, the eggs are placed within the baskets of one of the holders and that particular holder is hung upon the chain opposite the marker which indicates the length of time the eggs are to boil. The conveyer chain, which is kept in continuous motion from the source of power, carries the egg holder to the disks 15. The rotating disks 15 will, when the egg holder gets into the proper position adjacent to them, lift the egg holder from the pan by means of the teeth 16, which will pass under the shaft of the roller 21 of the egg holder. The continued rotation of the disks 15 will carry the egg holder over the disks onto the runway, the egg holder sliding down the runway on the roller 21 to the stop 18, in position to be lifted off by the attendant. The travel of the conveyer chain is so regulated that the length of time which elapses between the placing of the egg holder upon the chain and its being picked up by the disks will correspond to the time inscribed upon the marker alongside the position where the egg holder is hung upon the conveyer chain. I preferably, as shown in Fig. 1, make the conveyer chain of long and short links with the parts so timed and proportioned that the teeth of the delivery disks 15 will engage with the roller 21 of the egg holders in line with the long links.

As will be evident, I secure by the features of invention shown, a construction in which the timing is very accurately regulated and without the necessity of any regulating clock work with its different disadvantages, and I secure a simple and convenient form of egg holder, any number of which, within the limits of the apparatus, may be carried along the conveyer chain at the same time. My construction may be more or less modified without departing from the invention, the scope of which is defined in the following claims.

I claim:

1. In apparatus of the class described, the combination with a comparatively long tank, of a transverse horizontal shaft journaled on one end of the tank and at the upper edge thereof, means for actuating said shaft, a second shaft parallel to said first-named shaft journaled on the opposite end of the tank, a sprocket wheel rigidly mounted on each of said shafts, an endless conveyer chain meshing with and operatively connecting said sprockets to actuate said second shaft, notched disks rigidly secured on said second shaft and arranged one on either side of the chain, the openings of said notches being directed upwardly to form shoulders, an outwardly and downwardly inclined track on the tank terminating at its high end between said disks and below the upper peripheral edge thereof, and egg holders removably carried by said chain and formed to straddle said chain and disks and engage said shoulders to be lifted thereby and deposited on said inclined track when said first-named shaft is actuated.

2. In an egg boiling device, the combination with a tank, of a power driven transverse shaft journaled on one end of the tank, a second shaft mounted in movable journals on the opposite end of said tank and parallel with said first-named shaft, a sprocket wheel rigidly mounted on each of the shafts, a conveyer chain meshing with and operatively connecting said sprocket wheels to actuate said second shaft, peripherally notched disks rigidly secured on said second shaft one on either side of the chain and immediately adjacent thereto, said notches opening upwardly to form shoulders, egg holders carried by said chain and adapted to removably fit over the latter and said disks and engage said shoulders in the latter to be raised thereby when the chain is moved and means for adjusting said movable journals for the purpose set forth.

3. In an egg boiling device, the combination with an open top tank, of horizontal transverse shafts carrying rigidly sprocket wheels, journaled one at each end of the tank at the top edge thereof, means for actuating one of the shafts, an endless chain meshing with and surrounding said sprocket wheels, the upper run of the chain being freely accessible at all times, disks projecting above the upper run of said chain and having upwardly directed notches forming shoulders, said disks being rigidly secured on one of said transverse shafts one adjacent either side of the sprocket wheel thereon, time indicator marks along the edge of the tank and adjacent the chain, and egg holders adapted to straddle the chain and said disks and insertible over said chain at any point along the line of said time indicator marks to be conveyed by said chain when said actuatable shaft is actuated, into the path of said disks to engage the shoulders thereon for the purpose specified.

In testimony whereof I affix my signature in presence of two witnesses.

VALENTINE G. BECKER.

Witnesses:
R. A. FISCHER,
H. W. WANGAN.